US012282767B2

(12) United States Patent
Rosania et al.

(10) Patent No.: US 12,282,767 B2
(45) Date of Patent: Apr. 22, 2025

(54) SOFTWARE TOOL INTEGRATION

(71) Applicant: Formagrid Inc., San Francisco, CA (US)

(72) Inventors: Paul Rosania, San Francisco, CA (US); Wayne Fan, San Francisco, CA (US); Nicole Zeng, Palm Springs, CA (US)

(73) Assignee: Formagrid Inc, San Francisco, CA (US)

( * ) Notice: Subject to any disclaimer, the term of this patent is extended or adjusted under 35 U.S.C. 154(b) by 336 days.

(21) Appl. No.: 17/900,210

(22) Filed: Aug. 31, 2022

(65) Prior Publication Data

US 2023/0069374 A1 Mar. 2, 2023

Related U.S. Application Data

(60) Provisional application No. 63/239,095, filed on Aug. 31, 2021.

(51) Int. Cl.
*G06F 8/77* (2018.01)
(52) U.S. Cl.
CPC ................................. *G06F 8/77* (2013.01)
(58) Field of Classification Search
None
See application file for complete search history.

(56) References Cited

U.S. PATENT DOCUMENTS

| | | | |
|---|---|---|---|
| 8,429,597 B2 * | 4/2013 | Prigge | G06F 8/38 |
| | | | 717/104 |
| 9,727,376 B1 * | 8/2017 | Bills | G06Q 10/0631 |
| 11,288,608 B2 * | 3/2022 | Jafari | G06F 3/0483 |
| 11,880,342 B2 * | 1/2024 | Seward | G06F 3/0481 |
| 2022/0405094 A1 * | 12/2022 | Farquhar | G06F 9/44505 |

* cited by examiner

*Primary Examiner* — Marina Lee
(74) *Attorney, Agent, or Firm* — Fenwick & West LLP

(57) ABSTRACT

Techniques are described herein for implementing and using a project management interface software tool configured to integrate and bind together multiple additional software tools and provide a single engagement layer. In various examples, the project management interface may provide users (e.g., individual contributors such as designers, developers, project managers, etc.) with alignment and focus, by serving as a single source of updated and accurate project data across all of the multiple underlying tools. The project management interface also may improve user functionality and leverage by providing deep integrations and cross-tool interoperability. The project management interface described herein also may improve ergonomics by providing a consistent and uniform user experience, and building on the backend technologies of the underlying tools rather than replacing those tools.

20 Claims, 15 Drawing Sheets

```
{
  "id": "0000-0000-0000-0000",        // our GUID
  "source": "jira:mapo",              // foreign key, mapping to the object's storage
  "retrievedAt": 1589411113,          // unix timestamp of last known canonical version
  "fields": {                         // canonical field values
    "name": "Sample Task",
    ...
  }
  "stagedUpdates": [
    {
      "op": "modify",
      "ts": 1589411213,
      "fields": {
        "name": "Updated Task",
        ...
      }
    },
    {
      "op": "delete",
      "ts": 1589411413,
    }
  }
}
```

FIG. 2

```
{
    maxAge:     600,   // ten minutes
    operation:  'receive',
    objectTypes:  ['projects', 'tasks']
}
```

FIG. 3

```
type Subscription   {
   syncStatusUpdated:   StatusUpdate
} type StatusUpdate   {
  state:   String
}
```

FIG. 4

```
Subscription:  {
  syncStatusUpdated:   { subscribe: () => pubsub.asyncIterator ([SYNC_STATUS_UPDATED]),  }
}
```

FIG. 5

```
loop { # run forever
  queue := [ ]

# Seed the queue with URLs from each source
  # Typically, each source would provide at least one root
  # For example, "tickets assigned to me" or "open PRs on my team"
  for source in sources {
    for seed in source.seeds {
      queue.enqueue({ source, seed });
    }
  }

# Drain the queue
  while (next = queue.shift())   {
    # Fetch next URL from top of queue
    source, body := fetch(next)

# Pass response body to appropriate source for parsing and storage
    edges := source.receive(body)

# Enqueue any references from that page for future fetching
    for edge in edges {
      queue.enqueue({ source, edge })
    }

# Space requests out by 1s
    sleep(1000)
  }
}
```

FIG. 6

My Tasks

- ☐ BUILD-923 ✓ Additional icon sizes for Windows We need the following additional custom icon sizes for Windows.... — 2 weeks ago
- ☐ BUILD-921 ✓ Bundle auth flow routes together Alonso had a great suggestion for tidying them up: https://github.com/... — 2 weeks ago
- ☐ BUILD-920 ✓ Add tests for link syncing Per https://github.com/balsa/desktop/pull/1674#discussion_r663269750, in v2 — 2 weeks ago
- ☐ BUILD-919 • Certain saved search emojis don't work on Windows On Windows, emoji such as - render as text rathe... — 3 weeks ago
- ☐ BUILD-917 ✓ Add tests for autoupdate We got stung by a bad version of election-updater. It would be great to have te... — 3 weeks ago
- ☐ BUILD-806 • GitHub remote searches with wildcards don't work My config is balsa/*, which causes searches like this:... — Jun 29
- ☐ BUILD-793 ✓ Improve error handling for partial invalid queries it's pretty easy to write queries that throw errors from the... — Jun 22
- ☐ DEVPROD-24 ✓ Scrub Jira searches in Sentry We're getting search queries in Sentry exceptions, which can include terms the... — Jun 17
- ☐ DEVPROD-21 ✓ Don't mix dev & production logs Currently our dev logs write to the same files as our production logs. This... — Jun 17
- ☐ DEVPROD-10 ✓ Announce new versions in #builds Having a robot auto-announce new versions in #builds would be gre... — Jun 1
- ☐ BUILD-726 • Extract ID munging into helper function Per https://github.com/balsa/desktop/pull/1393#discussion_r64001224... — May 14
- ☐ OPS-132 ✓ Add Prettier to OSS sponsorship program Prettier accepts OSS sponsorships! I saw them thanking sponsors o... —

↱ balsa/desktop#2108 ▪ Bump electron-updater from 4.5.0 to 4.5.1 ▪ Bump electron-updater from 4.5.0 to 4.5.1... — 2 hours ago ↱ balsa/desktop#2114 Bump use-resize-observer from 7.0.1 to 8.0.0. Bumps use-resize-observer from 7.0.1 to 8... — 2 hours ago

JIRA POWERHOVER

- [ ] DESK - 22 ■ Revisit strategy for Promise.all in Jira   2m 👥 ≡
- [ ] DESK - 22 ■ Revisit strategy for Promise.all in...   2m 👤 ⌀ # ↖

🔍 Filter assignee

👤 Wayne Fan
👤 Madeline Shortt

GITHUB

- ⑂ balsahq/desktop#12 ○ Add network timeou...   2m 👥 ☐ ฿
- ⑂ balsahq/desktop#12 ○ Add network timeouts to...   👤 ⌀ # 👎 ↖

LINKED ISSUES IN INSPECTOR

DESK-240

Bypass the multi-byte ADP interface!

- DESK-2 • DESK-22 ∨ DESK-40

Lorem ipsum dolor sit amet, consectetur adipiscing elit. Donec pellentesque erat vel dolor aliquet interdum. Pellentesque orci libero, hendrerit id mi et, venenatis dictum dolor. Curabitur vitae risus tincidunt, lobortis felis id, sodales ex, Nunc consectetur purus et tortor efficitur congue. Sed facilisis orci ut ligula auctor efficitur. Aenean porta neque ante, id placerat ex imperdiet in. Duis maximus ex ultrices tempor maximus. Donec ut est posuere, laoreet ipsum sit amet, interdum est. Phasellus sollicitudin sodales tellus in suscipit. Aenean sollicitudin urna id lea porta mollis Type: Task
Status: To-do

Jasson Eberle
Paul Rosanna
None
None
None

- DESK-02 The CD-ROM from fa...
- DESK-32 I'll transmit the fibe...

24 The AI virus is down, ind...
View

Created 2 days ago
Updated

○ Command
○ My tasks

Projects
- Desktop DESK
- Alpha ALPHA
- Hiring HIRE
- Intro Website INTRO
- iOS IOS
- Android AND balsahq
- desktop
- intro-website
- sandbox
- graphal-js

FIG. 14

SOFTWARE TOOL INTEGRATION

CROSS-REFERENCE TO RELATED APPLICATIONS

This application claims priority to and is a non-provisional of U.S. Patent Application No. 63/239,095, filed Aug. 31, 2021, and entitled "SOFTWARE TOOL INTEGRATION," the disclosure of which is incorporated by reference herein in its entirety for all purposes.

BACKGROUND

Specialized tools for individual contributors such as software designers, developers, testers, project managers, and other skilled workers are ubiquitous. For instance, within the technical fields of software design and development, an individual contributor may routinely use one or more tools for source code control, design, documentation, and project management. Examples of such software and/or hardware-based tools may include, but are not limited to, source control tools such as GitHub®, BitBucket®, and GitLab®, etc., web-based design and prototyping tools such as Figma®, Sketch®, Adobe XD®, and Balsamiq Wireframes®, etc., documentation tools such as Google Docs®, G Suite®, WPS Office®, Microsoft 365®, Dropbox®, Zoho Docs®, etc., and project management tools such as Jira®, Notion®, ProofHub®, Backlog®, etc.

With the abundance of tools used by different organizations, for different projects, and by different individual contributors, technical personnel such as engineers and designers often spend more time planning, coordinating, and updating stakeholders and leadership, than they do coding, designing, and conducting research. Each of these tools requires significant time and overhead for individual contributors, in terms of the user's time and interactions (e.g., different locations to check for tasks, messages, updates, comment feeds, etc.), as well as the screen space required and number of processes running on the user's workstation. These disparate tools often provide little or no interoperability with respect to workflow enforcement, process mapping, or administrator controls, and also fail to provide a consistent and coherent user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 2-6 illustrate example psuedo-code and/or code snippets representing various data models, objects, and algorithms, in accordance with one or more implementations of the disclosure.

FIGS. 7-11 depict example user interface screens of a project management interface tool, in accordance with implementations of the disclosure.

FIGS. 12-14 depict example user interface screens of a powerhover tool, in accordance with implementations of the disclosure.

DETAILED DESCRIPTION

Figure 1:
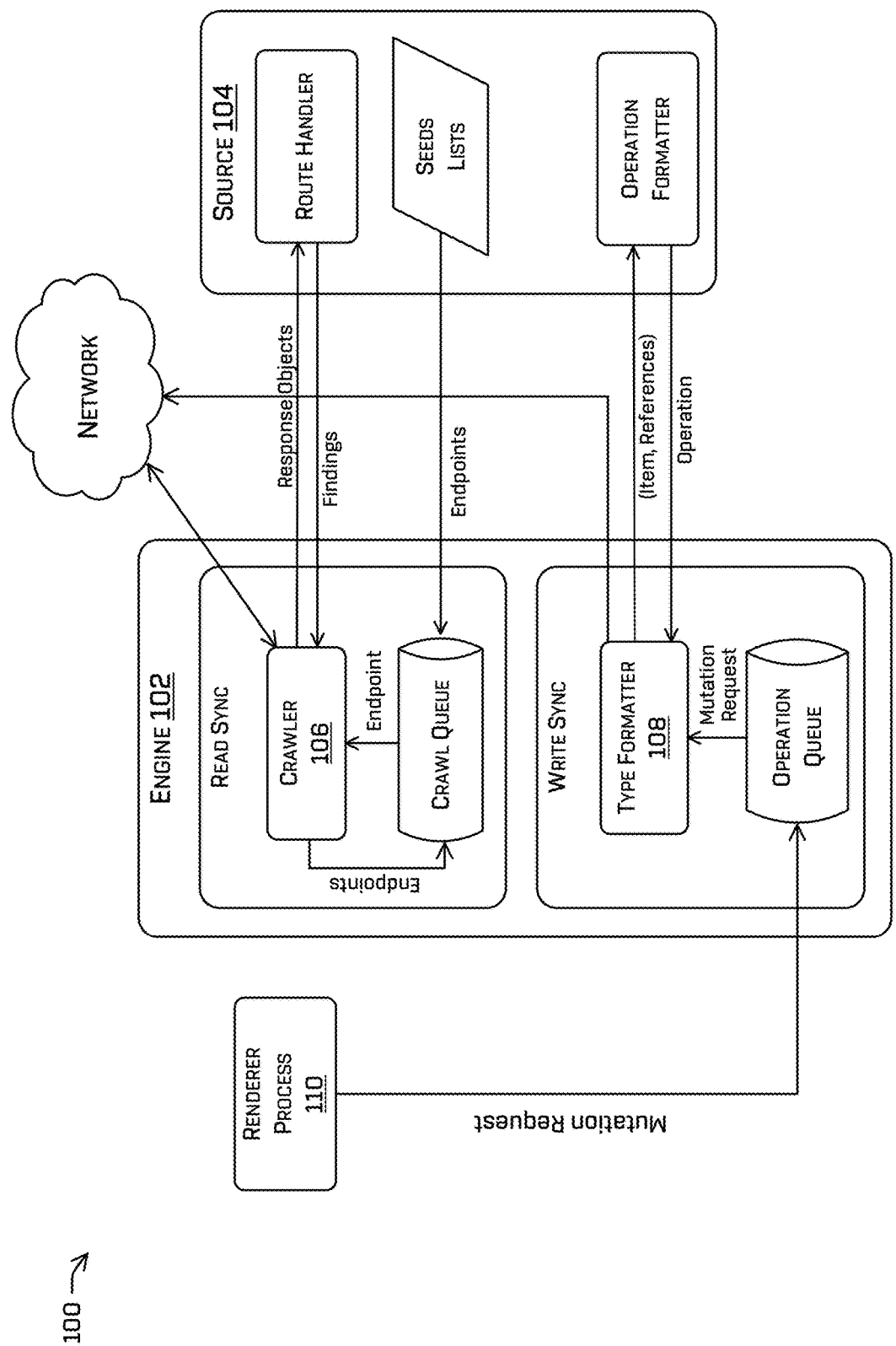
FIG. 1 illustrates a system architecture diagram for an example synchronization engine, in accordance with one or more implementations of the disclosure.

This application describes techniques for implementing and using a project management interface software tool configured to integrate and bind together multiple additional software tools and provide a single engagement layer. In various examples described herein, the project management interface may provide users (e.g., individual contributors such as designers, developers, project managers, etc.) with alignment and focus, by serving as a single source of updated and accurate project data across all of the multiple underlying tools. In some examples, the project management interface also may improve user functionality and leverage by providing deep integrations and cross-tool interoperability. The project management interface described herein also may improve ergonomics by providing a consistent and uniform user experience, and building on the backend technologies of the underlying tools rather than replacing those tools.

In some examples, the project management interface software tool described herein may provide a command center for engineers and other skilled/technical individual contributors. A crawler may be implemented to retrieve project-specific and/or user-specific items (or tickets) from various underlying third-party software tools, and aggregate the tickets from the underlying tools to present a command center for the user providing a unified view displaying the user's highest-priority tasks and assignments. The unified view may include user interfaces and components displaying everything assigned to the user, and messages and project updates since the user last logged off, across all of the underlying tools upon which the project management interface tool is built. For instance, the project management interface tool may present a view that displays a project management ticket (e.g., a Jira ticket), an updated design from a design tool (e.g., a Figma design), and a product specification associated with the product (e.g., a Notion document), all at once within a single view. The project management interface tool may use APIs to integrate with any of the underlying tools described herein, including but not limited to source code control tools, design tools, documentation tools, project management tools, bug collection tools, team/user collaboration tools (e.g., email tools, chat/instant messaging tools), calendar tools, etc.

As described below in more detail, various implementations of the project management interface tool may include various functionality and features including an interface with a unified task view and/or toggling board view, bidirectional communication with the underlying tools to view and update tasks, a sidebar showing different project boards and project-specific functionality, a power hover feature (described in more detail below), and search functionality. These features, along with other features described herein, may improve the user experience of individual contributors and provide various technical advantages for organizations. For instance, various examples of the project management interface tool may enhance team flow, by monitoring continuous integration runs, predicting code reviews, and the like. The project management interface tool also may allow managers to identify and address slowdowns (e.g., design changes during quality assurance phases), provide a unified source of organization-level data visibility with improved accuracy, provide visibility into resource allocation and usage, and identify bottlenecks and cross-team optimization opportunities. The project management interface tool may be built on various combinations of existing tools, serving as an engagement layer, and using the existing tools as the systems of record. This may improve the efficiency the underlying tools for the most common use cases, improve the interoperability of the underlying tools, automate the common workflows, assist with in-application bug capture, facilitate upward reporting, and the like.

Synchronization Engine

In some examples, a synchronization engine may be implemented to perform bidirectional communication between the project management interface tool, and one or more underlying tools such as design tools, source control tools, documentation tools, etc. The synchronization engine may be configured to use the APIs provided by the underlying tools to query, retrieve, and update the data stored within the backend technologies of the underlying tools, so that those tools remain the primary and accurate data source. An example architecture 100 for a synchronization engine is shown in FIG. 1. The implementation details and various features of the synchronization engine are described in following sections.

GUIDs

In some examples, the synchronization engine 102 may identify objects based on its own ID scheme, for two key reasons. First, the synchronization engine 102 may deal with heterogenous systems, and it may be desirable not want to leak their ID systems into the domain model of the synchronization engine. Second, it may be advantageous for the synchronization engine 102 to create new work objects instantaneously, without waiting for servers to issue IDs (e.g., as opposed to waiting to hear back from the server before referring to the object.)

Differential Updates

For each work object, the synchronization engine 102 may keep track of both the last known canonical version, as well as what has changed locally. This may allow fine grained conflict resolution.

Pluggable Storage

The synchronization engine 102 may allow an arbitrary number of storage systems to be plugged in, and may keep track of where each work object is stored. The synchronization engine also may allow migration between compatible types of storage.

Data Model

An example code snippet of a canonical representation of a data model is shown in FIG. 2

UI Layer Representation

In some examples, the local representation may be flattened for the UI layer, for simplicity. For instance, each of the various heterogenous systems and/or services of the underlying tools may store the true and accurate canonical representation of the data associated with that tool. The synchronization engine 102 may request and receive updates from the various heterogenous systems, and may generate a canonical "fields" object to reflect the canonical representation (which the application considers to be current and accurate canonical representation). Additionally, the application may provide support for users to perform various updates to the data associated with the underlying tools, including creation, modification, and deletion of objects, etc. The updates performed by the application may be considered to be pending updates, until the updates are submitted to and accepted by the underlying tool, which may happen in real-time, near real-time, or after a delay in order to provide an improved and more responsive user experience while not overtaxing the servers of the underlying tool.

In some cases, the application may create a flattened representation that reflects the (unsynchronized) intended final state. The flattened representation may be based on the most recent canonical representation received from the underlying tool, along with the additional pending changes subsequently made within the application. This flattened representation then may be provided to the UI layer, and the UI layer may present the flattened representation and provide any and all UI functionality based on the flattened representation, even if in some cases the flattened representation may not accurately represent the canonical representation of the underlying tool. In such examples:

The "fields" object may reflect the canonical representation.

A "pendingCreation" key may exist, which is true when the object is new and has not been synced.

A "pendingUpdates key" may include the names of fields which have pending modifications.

A "pendingDeletion" key may exists and is true when the object is pending deletion.

The synchronization engine may provide the UI layer with both the flattened and canonical representations, as well as the list of updates, so that these can be presented to the user.

Workflow

Client updates. The user may create new work objects, update existing objects, or delete objects.

Creating new objects. The new item is created with a pending bit indicating the underlying tool does not know about it yet. When sync is successful, the pending bit may be cleared.

Updating existing objects. Changes may be staged. For instance, each modified field may be tracked separately from the currently known canonical value. The synchronization engine 102 may determine when to push these updates to the underlying tool. When sync is successful, staged changes are merged into canonical state, and modified bits may be cleared.

Deleting objects. The deletion itself may be staged, and modifications may be no longer permitted. The UI may reflect that a deletion is pending and fields should be read-only. An alternative may be for the project management interface tool to simply stop showing deleted objects while the deletion is staged, and if a delete fails the UI can be restored. The permanent inability to delete something should be relatively rare, for instance, when either the user lost permission or the project management interface tool has identified an error/issue such as a local desync, bad object IDs, etc. When the sync is successful, the synchronization engine 102 may purge the item from the data store.

Server updates. Syncing may detect new work objects, updates to known work objects, or deletions.

New work objects. New objects may be merged into cache. If they have relationships with other objects, e.g. if the project management interface tool determines that a new task is to be created for an existing project, then the task list of the project may be updated.

Updates to known work objects. Generally, such updates may be are merged with the canonical record. If there are pending updates, the synchronization engine 102 may proceed as usual. This might mean the server-side update may be overwritten by one or more of the pending updates. In some cases, the synchronization engine 102 may be configured to pause the sync process and allow the user to decide what to do.

Linking work objects. In some examples, the synchronization engine 102 may include functionality to determine and maintain links to track the relationships between work objects (e.g., tasks). In some instances, a relationship between two different tasks may be known by the underlying tool. Tasks with the Jira underlying tool, for example, are can be marked as related within Jira. Such links may be referred to as "explicit links."

In other examples, the synchronization engine 102 may determine relationships between tasks, within the same underlying tool or within different underlying tools, that are not explicitly coded within those underlying tool(s). For instance, within a task description, a user may include a URL to another task. Such URLs may be links to task associated with the same underlying tool or a different tool. For instance, a link in a Jira task description/comments field may refer to a different Jira task, a GitHub task, etc. Such relationships might not be explicitly tracked by the underlying tools. However, when the synchronization engine 102 described herein syncs with both underlying sources 104, it may be configured to identify the link, determine that the link is associated with another synchronized task (from the same or different tool), and may associate/connect the tasks together. Such links may be referred to as "implicit links" (e.g., since they are implied by the existence of the URL, but not explicitly coded as a relationship within the underlying tool(s) (e.g., source 104).

Additionally or alternatively, the synchronization engine 102 may extract URLs (or any other cross-reference information) from tasks, even when those URLs do not refer to other tasks. Such links may be referred to as "generic links." In some examples, the system may identify and analyze (e.g., compare) the URLs, and may determine that two different tasks are related if both include the same (or a similar) generic link. For instance, two tasks from two different tools may be determined to be related if they include the same URL to a web page within a company's website. In such examples, the synchronization engine 102 may infer that the two tasks are related because they both link to the same place.

In some examples, the synchronization engine 102 also may be configured to determine that two different URLs (e.g., URLs that are not identical text strings) may nonetheless refer to the same location or may be the same link. For instance, the synchronization engine 102 may execute a clean-up process on URLs, to convert characters, remove query strings, determine associated domain names, etc. After performing such a clean-up process for URLs, the synchronization engine 102 may identify two or more URLs that are textual different that nonetheless refer to the same (or a similar) resource, and thus that the tasks containing the URLs should be linked.

Further, in addition to linking tasks based on containing the same (or a similar) URL, the synchronization engine 102 also may identify multiple linked tasks using other cross-referenced data and/or data similarities, such as different tasks that include or refer to the same person (e.g., assigned to, commented by, viewed by, referred to within description or comments, etc.), as well as different tasks that include or refer to the same additional task, project, or file.

Deletions.

Generally, deletions may cause the synchronization engine 102 to delete/remove the local objects. If a deleted object is currently visible to the user, and/or if the deleted object has pending updates, the project management interface tool may determine either to delete/remove the object anyway, or to defer or allow the user a chance to restore the object.

Requesting a Sync Operation/Process

For the project management interface tool to synchronize its local data with the data from the underlying tools, the synchronization process may be a relatively slow, heavyweight, and failure-prone process. As a result, in some examples the project management interface tool and/or synchronization engine 102 may hide these problems from the client (e.g., both from the user, and from the client code of the project management interface tool) to avoid the client having to worry too much about or attempt to manage the internals of the synchronization process. However, in some cases the client may need to be able to ask the synchronization engine 102 to perform refresh operations, and when it does, it may need to know right away when updates arrive, potentially even blocking in the meantime. For example, during signup, project management interface tool may need to retrieve the user's project list after their authentication credentials are received. It may be advantageous to retrieve the user's project list immediately, and not to wait until the next scheduled sync, because the next step of the signup process may be to show the project list via the interface and ask the user which of the projects they are interested in syncing.

In other examples, when the user is viewing a specific task, the client of the project management interface tool may instruct the synchronization engine 102 to refresh that task, so that the user may see the latest information. In these examples, the client may perform this task predictively, based on a determination of the objects in the interface that the user is most likely to click on next, thereby allowing the synchronization engine 102 to try to retrieve updates before stale content is displayed. The prediction of which objects in the interface the user is most likely to click on may be based the current UI view, including which objects, links, menu options, etc., are display in the current view. Additionally or alternatively, the prediction of which objects the user is most likely to click on next may be based on application-specific, tool-specific, project-specific, and/or user-specific patterns determined based on previous user behaviors. After determining a prediction of an object that a user may potentially select via the user interface, the application (e.g., the project management interface tool) may preemptively transmit a request to the underlying tool to retrieve the current and accurate canonical representation of the object, so that it may be accurately presented to the user via the application with little or no delay.

In some examples, when the user initiates a search via the interface, the synchronization engine 102 may be configured to return matching cached results, and also may provide the client enough information to know that more will be coming from the server, as well as a way to know when those updates have arrived. To support such use cases when necessary, while providing as simple an interface as possible in less complex situations, the synchronization engine may be configured to support the following two features:

1. Perform a "full sync" on a regular, recurring basis. The synchronization engine 102 may be configured to send every queued update and may receive all server-side changes from all data sources (e.g., source 104) and all object types.
2. Accept "sync requests" from the client. The synchronization engine 102 may be configured to accept "full" or "partial" sync requests from the client. In some cases, for "partial" sync requests, the sync request may specify just the sources, object types, filters, or other criteria to limit and potentially accelerate the sync.

Making a Request

Client→Server. In some examples, there may be no "sync" APIs for client to server sync requests. Clients therefore may trigger syncing by making normal GraphQL queries with specific parameters that may cause the server to conclude a sync is needed. A query that might trigger a sync may include, for example, specifying a "maxAge" query parameter. If the cached data within the server of the project management interface tool would be too stale to satisfy this requirement, the server may ask the synchronization engine 102 to perform a sync. Another example of a query that might trigger a sync may include a query for data that the server does not have. For example, the client may run a search, and although the server of the project management interface tool may have one or more local hits, it cannot know for sure that it has all of the matches to satisfy the search request. As a result, the server may ask the synchronization engine 102 to perform a sync. As another example, the client may ask for information regarding a project or task the server does not have in its cache, causing the server to ask the synchronization engine 102 to perform a sync. In some cases, mutations might not directly trigger a sync, but their effects may be enqueued and processed during the next scheduled full sync.

Server→Engine. In contrast, when the server of the project management interface tool concludes that a sync may be warranted (e.g., when a maxAge was provided), the server may call/invoke the synchronization engine 102, passing in a "Request" object such as the object in the example shown in FIG. 3.

In this example, the synchronization engine 102 may respond with a promise that resolves when sync is finished. The promise need not include any data, and the server may be required to query the cache for the data.

Engine Internals

In some examples, the synchronization engine 102 may attempt to fulfill all sync requests with as few synchronization runs as possible, both to minimize turnaround time and to reduce load on the data sources. For example, if a "full sync" is enqueued, one or more partial sync requests could be tied to the full sync promise in some cases, because the full sync is likely to be a superset of the partial sync's request. In some cases, partial syncs for specific tasks and/or custom searches may cast a broader net than a full sync, and thus might not be a subset of a full sync. As another potential optimization, when multiple syncs are enqueued for the same object type, the synchronization engine 102 may coalesce them into one request with parameters that satisfy all the requests.

Receiving a Response

To provide improved performance in some cases, the server of the project management interface tool may, in some cases, be configured to return responses to the client as soon as possible, even when a sync is needed. Such examples may enable the client to know (a) what data is available locally, in case it wants to display some results to the user, (b) whether the server has concluded that it needs to fetch additional information, and (c) how the client can find out about the result.

Engine→Server

In some examples, the synchronization engine 102 may return a metadata object instead of just a promise. Additionally or alternatively, the synchronization engine 102 may return a metadata block in the resolved promise.

Server→Client

In some examples, the server may return to the client one or more of: cached data, an indication of whether more data is coming, and/or a request ID so the client can poll for data. Additionally or alternatively, subscriptions may be used to provide a response from the server to the client within the project management interface tool.

Synchronization Status

In some cases, it may be advantageous to expose as much information as possible, such as with a logging service, where we can have different levels and the UI can determine what to display in what area. For instance, major level events may be highlighted, but maybe verbose is tucked away in a separate display. The backend may provide detailed, structured information, the facts. The Client may decide how to tell the story in the UI.

Proposed Structures:

In some examples, there may be a number of subscriptions, each representing a different type of event. For instance, these subscriptions may include:

1. Sync engine updates
   Examples: The sync engine is running, completed, idle, stopped
   Name: syncStatusUpdated
   Event type: SYNC_STATUS_UPDATED
   Contents:
   state: running or completed, for example. Required.
2. Sync source updates
   Examples: Jira connection A synced up last at 1:47 pm, Github connection Blast synced down at 2:01 pm, Jira connection A is beginning to sync 100 tasks, Jira connection A is unauthenticated, Github connection B is timing out
   Name: sourceSyncStatusUpdated
   Event type: SOURCE_SYNC_STATUS_UPDATED
   Contents:
   source: Jira or Github, for example. Required.
   instance: A unique identified of the source connection, the base url for Jira or repo name for Github. This allows us to have multiple Jira connections in one sync engine. Required.
   status: starting, complete, or error. Required. This type helps to determine the presence of the optional parameters.
   syncType: Either send or receive. Optional.
   numberofItems: Number of items either to send, to receive, or have successfully sent or received (depending on the status). Optional.
   timeCompleted: Time on the server when the specific sync completed. Optional.
   error: Information about the error. Optional.
3. Item sync updates
   Examples: Jira connection A created task 1234 in Project X, Jira connection C updated task 4321 in Project Y, Github connection B updated PR 567 on repo Z
   Name: ItemSyncStatusUpdated
   Event type: ITEM_SYNC_STATUS_UPDATED
   Contents:
   source: Jira or Github, for example. Required.
   instance: A unique identified of the source connection, the base url for Jira or repo name for Github. This allows us to have multiple Jira connections in one sync engine. Required.
   itemId: The id of the item, the task in Jira or PR in Github. Required Note this the external Id.

containerId: The id of the container of the item, the project in Jira or the repo in Github. Required. Note this the external Id.

operation: created or updated, for example. Required.

4. Request sync updates

Examples: Received status 200 from https://balsa.atlassian.net/rest/api/2/project/DESK Request to https://balsa.atlassian.net/rest/api/2/project/TEST completed in 20 ms Name: RequestSyncStatusUpdated Event type: REQUEST_SYNC_STATUS_UPDATED Contents:

url: URL of the request made. Required.

httpStatus: The status the required received. Optional (there may be error scenarios where we don't receive an http status)

error: The error the request received. Optional.

responseTime: The time it took for the request to complete. Optional.

A schema example is shown in FIG. 4, and a resolver example is shown in FIG. 6.

In some examples, for synchronization state, it may be useful to know when the state has changed, and to only push information at those times. For instance, when the synchronization engine 102 changes status (e.g., starts, stops, runs, idle) it may push to the subscription. When the synchronization engine 102 syncs (e.g., calls syncOnce but really SyncRun.execute), the Sources may update their class properties to reflect whether they are authenticated, the network connection is good, when is the last time they synced up and down, etc. The Sources also may keep track of which of these changed, and may publish the changed data. In some cases, a push may only push information about authenticated if it changes for example, and might not necessarily push it every time a sync is performed. It may determine in some cases if the tool is authenticated and can connect to the service (e.g., no network timeouts) in one request. In such cases, it may return to the last time it pulled and pushed data The project management interface tool may pass down the partially applied pubsub.publish (SYNC_STATUS_EVENT_TYPE) function all the way through the application in some cases, to allow the tool to be detailed without passing that info back up the chain. In some examples, the project management interface tool may add a GraphQL subscription to expose the synchronization status. This may allow the tool to display the synchronization status (e.g., running, idle, error) within the user interface. As a result, the server of the project management interface tool may need a way to push that data to the renderer 110. Additionally, in some instances, the project management interface tool may be configured to differentiate between permanent authentication failures (e.g., an expired cookie), since the tool may have no way of knowing when the user is required to reauthenticate.

Smart Synchronization

Improvements to Synchronization Strategy

As noted above, various techniques described herein may be implemented using a crawler component 106 (or crawler 106) configured to retrieve objects and/or related-data from a combination of multiple different underlying tools, so that the data may be formatted (e.g., using a type formatter 108) and presented to the user via the application UI in a uniform manner. In some examples, the crawler component 106 may be designed with a common set of subcomponents that are adaptable to interact with each of the multiple different underlying tools using the same subcomponents in a similar or identical manner. In such examples, the crawler 106 may be configured to access the different underlying tools at different times rather than simultaneously (e.g., based on a rotation schedule and/or based on an event or request associated with a specific tool), in order to save processing time and improve data management by the synchronization engine 102.

In some cases, the crawler 106 may adopt a search crawler-like model, in which it may retrieve not only a set of objects from the underlying tools to be presented via as tasks the UI, but also may retrieve related data and/or other objects associated with the retrieved objects (e.g., people, projects, URLs, files, etc.), in order to determine relationships and dependencies between the various data objects.

1. Be gentler on sources. In some cases, we (e.g., the project management interface tool) may hit our sources hard to perform syncing, at a fixed interval. We'd be able to fetch more and keep things better updated without hitting rate limits by continuously updating at a fixed speed. This may be especially critical with on-premise sources like Jira Server, since these tend to be under-provisioned, making spiky clients extremely troublesome. In some systems, on-premise tools are managed by customers.

2. Propagate user-initiated updates immediately. When a user makes a change, we should be able to send it to the server instantly. In other systems, there may be no way to do this if we're mid-sync, and when we do send the update it can end up getting caught up in a bigger wave of syncing.

3. Update active items rapidly. We want to be able to update things that are currently being viewed as quickly as possible when they change. For example, new comments for a currently viewed task may be picked up and the task updated in less than 1 second, to provide a better user experience and the appearance of "chatting" on the ticket. Similarly, when viewing a board the ticket status may be updated within 1 second is some cases, so for sprint planning when two people have a board up, they may be in sync with each other as they move tickets around.

4. Build a deeper local cache. To help builders be as productive as possible, we want data loading to feel instant, which means having a local version of as many things as we can. In some examples, the syncing may be rigid, based on heuristics like ticket assignee and settings user-selected projects. When adopting a search crawler-like model, we can fan out and build a deep map of the broader world when we have idle sync time.

5. Handle stale data. In some systems, this data may be kept around indefinitely, regardless of whether the data is updated. Additionally or alternatively, data that hasn't been updated in awhile may be purged.

6. Improve reference handling. In some systems, the only chance to handle referenced data (e.g. a user mention of someone we don't know) may be to immediately fetch it at sync time. This leads to N+1-like scalability problems, where the sync engine generates an unknown amount of additional work for itself as it performs the sync. Ideally, we'd make two improvements: (1) make the client more resilient to missing data, and (2) enqueue things we discover, rather than fetching them synchronously.

7. Make it easier to write and maintain integrations. In some systems, sources may be responsible for the entire sync lifecycle for their source type. It may be easier to build and maintain many different source implementations if sources did less themselves and relied more on central infrastructure. For example, can we simplify sources down to just things that are provider-specific, like formatting requests, parsing responses, and telling the central crawler what relationships it discovered, so the crawler 106 can map things out and enqueue other things that need fetching?

8. Gain ability to flex resource usage. The strategy used by certain systems may generate a notable spike in CPU and network activity on a regular cadence, which isn't ideal when people are on battery power. In some systems, a tool for addressing this issue with certain architectures herein may be to decrease sync frequency. However, in some cases it may be advantageous for the system to use levers within the synchronization engine that can decrease the rate of more speculative syncing while keeping the most important things fresh.

Example Architecture

In some examples, an architecture may be implemented that builds around a continuously running sync engine structured like a search crawler. In practice this looks like a breadth-first search algorithm that runs forever. Example pseudo-code is shown in FIG. 6.

The risk with breadth-first search is always queue memory; a sufficiently large graph can generate a queue that exceeds available memory. We want to be able to handle very large customer datasets, so we need a way to cap queue growth. The best way to do this may be to use a priority queue (e.g. min heap) and cap its size by removing the lowest-priority enqueued items when we exceed a certain size. If we set priorities well, this allows us to crawl in whatever directions are highest value, without needing to hardcode traversal paths like we do today, hopefully simplifying our engine. This approach also allows us to throttle very easily, since it operates continuously at a controllable fixed rate. If we wanted parallelism at the cost of a bit of complexity, we could have one crawler loop per source, and allow crawlers to add to each other's queues when they encounter cross-source references. (For example, a Figma link in the Jira crawler could be added to the Figma crawler's queue). This approach may increase the total amount we can sync without causing rate limit problems, since it makes requests continuously with no downtime.

Example: Jira Sync

Example Flow

1. Check if authorized
2. Fetch current user identity
3. Send all queued updates
4. In parallel: fetch all issue types, all priorities, and all projects (unpaginated, plus 1 request per project for its icon)
5. In parallel: fetch all custom fields (unpaginated), and all statuses (1 request for each project)
6. In parallel: fetch issues via search API 2× (selected projects, and user is participating in)
   a. If unknown project, fetch project and project statuses
   b. If unknown user mentioned, fetch unknown user
   c. In parallel:
      i. If issue has epic, fetch epic if not stored
      ii. If issue has comment by unknown user, fetch user Alternative Example Flow 1. Enqueue fetch for custom fields (needed for epic link resolution) with highest priority
2. Enqueue fetch for issues via search API 2× with highest priority
   a. During issue processing, enqueue unknown projects, issue types, priorities, etc. with equivalent priority to current
   b. Persist issue with stubs for relational fields (for example, for a missing status, create that status row with just remoteId, and hydrate it later; task row should still have foreign key)
   c. If the search API returned a full page, enqueue another page with diminishing priority
3. Iterate through queue, fetching and hydrating items
   a. All items should have a database entry from the previous step, although it might be a stub
   b. Continue until queue is drained
4. After a set interval, return to (1) regardless of queue state Implementation Approach 1. Implement an experimental source in this style
2. Extract the crawler infrastructure into the engine (in parallel with the legacy pipeline)
3. Rewrite existing sources into new style
4. Remove legacy pipeline Implementation Details Sources. Sources should be as rudimentary as possible, to maximize code sharing and minimize per-source maintenance. Responsibilities of sources would be:

1. Providing a set of crawling "seeds"—the first URLs to fetch
2. Processing response bodies, including:
   a. Enqueuing additional URLs for fetching
   b. Specifying the correct callback for processing each URL
   c. Formatting requests (e.g. adding source-specific auth headers)

Cache. The database may function as a single shared LRU cache for sync data. The crawler 106 should use "retrievedAt" to purge data on an ongoing basis.

Request Prioritization. Priority queue with currently viewed item, frequently viewed items near top (somehow continuously reinserted) or with a separate specialized queue for priority items that are in the user's view or are candidates for the user's next action. User "attention" model. Client may be able to tell the crawler 106 what the user is currently viewing, and perhaps a probability-weighted list of other things the user is likely to view based on what's nearby in the UI. With this info, the crawler 106 can tune fetch frequency and prefetch things the user might click on.

Parallelism. In some cases, we may use per-provider queues and request spacing, as opposed to a global queue, to gain a bit of parallelism. In some instances, it may be advantageous not parallelize at the source level, when supporting multiple sources per provider (e.g., multiple GitHubs or multiple Jiras), which may causes an overrun in rate limits.)

Bursting. We may have the ability in some examples to burst-fetch when the user switches views. The worst case is a direct jump to a ticket ID we don't know about, which may reference users/projects/etc. that we also don't know about. We can enqueue with highest priority in these cases, but better still would be to immediately fetch, and decrease request spacing so we can load dependencies without waiting for ticks of the crawler 106. This would work if we run our sync speed slow enough to have some rate limit budget. References would also be top priority, to hydrate users/projects/avatars/etc.

Cross-provider references. A major strength of the "Smart Synchronization" approach described herein is that it may allow sources to report dependencies without understanding them. For example, JiraSource could spot a Figma URL, and without even knowing it's a Figma URL, it could enqueue it for the crawler 106, which could then decide:
1. Whether to fetch it at all (e.g. whether it matches a URL pattern for an installed source)
2. Which provider queue to insert it into
3. What priority to give it Contrast with other approaches, which may require coupling across sources via enhancers.

Placeholder/Stub Items. This approach may require a way to represent missing items, since we discover dependencies as we go instead of modeling out our sync flow to resolve dependencies hierarchically. If the client always assumes things could be missing, we can be very simplistic with the cache and never encounter a serious failure—things will just load in async as we recover data.

Loop Avoidance

One potential benefit of the crawler architecture described herein is simplicity for source authors. As a component of that simplicity, source authors are encouraged to declare references when processing API responses based entirely on what they might need based on the individual response, without worrying about whether the thing they need has been fetched already. However, this runs the risk of introducing a loop: if a task links to another task, for example, each task is likely to enqueue a reference to the other. While this seems like it would immediately lock the crawler 106 in a loop, in most cases it slows it down rather than getting it stuck. Since references are appended to the queue, the other things the source is trying to fetch typically do get fetched, we just make lots of unnecessary API calls, do a lot of unnecessary database work, and slow the crawl cycle by lengthening the queue.

To address this issue/problem, the crawler 106 may be configured to ignore references that have been fetched recently. Since tolerable freshness will vary based on the type of item, sources can specify the maximum tolerable age when they enqueue a request. As an example, linked tasks might be fetched no less than hourly, while project avatars may be fetched weekly, etc. We may identify "fresh" requests by maintaining a list of previous requests and when they were made. This list may be retained in memory and not persisted across restarts. In some cases, this information may be persisted across runs, to speed up "cold crawls" when the app boots up. To prevent the request history list from growing unbounded, the size may be capped and old items may be evicted.

Accordingly, in such examples the project management interface tool might not guarantee that fresh requests will be skipped. Rather, we are making our best effort to avoid them where possible. In practice, if we keep a sufficient cache and evict oldest-first, the impact of cache misses should be small, and should mainly have the effect of freshening the oldest stuff a bit more than necessary.

Technical Details maxStale—Borrowing from the HTTP spec, we use maxStale?: number to denote the upper limit of staleness the source will accept. If the crawler 106 knows a request has been made that's fresher than maxStale, it will skip the request; otherwise it will perform it.

Cache—The cache needs to perform the following operations: Search, Insert, Delete-min (oldest). Since request patterns will vary by source and be very hard to predict with any accuracy (not to mention the added complexity of attempting to do so), the cache's eviction algorithm is simply to evict the oldest request based on when it was made. Since our goal is to avoid loops and reduce request volume, it stands to reason that if the cache contains recently made requests, it's highly likely to contain requests that are made frequently or as part of loops in source handler references. The cache may an ES6 Map. Maps are ideal for a few reasons. For example, they support sub-linear search and insertion. (V8's operations are O(1).) Additionally, they may preserve insertion order in some cases, so that the oldest item may be first. Additionally or alternatively, the maps may be built-in in some cases, and need not have dependencies, versioning or change management, which may reduce the likelihood of bugs. In some instance, a separate cache may be provided for each source, which may provide advantages in per-source managing of the caches (e.g., preventing one source's usage patterns from evicting cache keys inserted by another source). In some examples, the cache capacity may be 100 keys, or another value determined and/or tuned over time based on observation of existing sources.

Example Use Case of Project Management Interface Tool

As noted above, in some examples the project management interface tool may provide features, functionality, and user interfaces to allows end users (e.g., individual contributors) to view unified task lists based on data (e.g., tasks, messages, updates, comment feeds, etc.) received from multiple underlying tools. The project management interface tool also may implement bidirectional functionality to allow the user to create, update, comment, and remove tasks from the project data sources maintained by the underlying tools. Various functionality and features of a project management interface tool are described below, including an example user interface 700 showing a unified task view with sidebar (FIG. 7), an example user interface 900 depicting a board view with sidebar (FIG. 9), an example user interface 1000 depicting a task view for reviewing and updating an individual task (FIG. 10), and an example user interface 1100 depicting a new task creation user interface (FIG. 11).

FIG. 7, shown below, depicts a "My Tasks" user interface 700 of the project management interface tool. Although not shown in this example, the user initially may use a number of onboarding tools to connect and authenticate the user's credentials and accounts to the various underlying tools, such as source control tools, design tools, documentation tools, project management tools, bug collection tools, team/user collaboration tools (e.g., email tools, chat/instant messaging tools), calendar tools, and the like. After the user connects and authenticates to its accounts/profiles for the underlying tools, the project management interface tool may perform a full sync with each underlying tool, and may present the "My Tasks" user interface view shown in FIG. 7. As shown in this example, the "My Tasks" user interface view may include a combination of the tasks based on data from multiple different underlying tools (e.g., Jira and GitHub in this example, but any number and combination of additional tools in other examples), in which the integrated sets of tasks from the different underlying tools are displayed in a uniform manner in a shared/ordered listing.

In FIG. 7, on the sidebar is shown all of the projects from the underlying project management tools (e.g., Jira) as well as the source code repositories from the underlying source control tools (e.g., GitHub), with which the user has chosen to sync. As noted above, the user may sync with one or multiple different project management tools, one or multiple different source control tools, and/or various other different types of tools. For each underlying tool, the user may choose to sync with one or more projects/repositories.

In some examples, the project management interface tool may include a project picker, either within the onboarding flow or outside of the onboarding flow, to determine which projects are selected for syncing by the synchronization engine. In some instances, the project management interface tool may automatically select and sync all projects, while in other instances a selected subset of projects may be selected and synced based on input from the end user.

Figure 8:
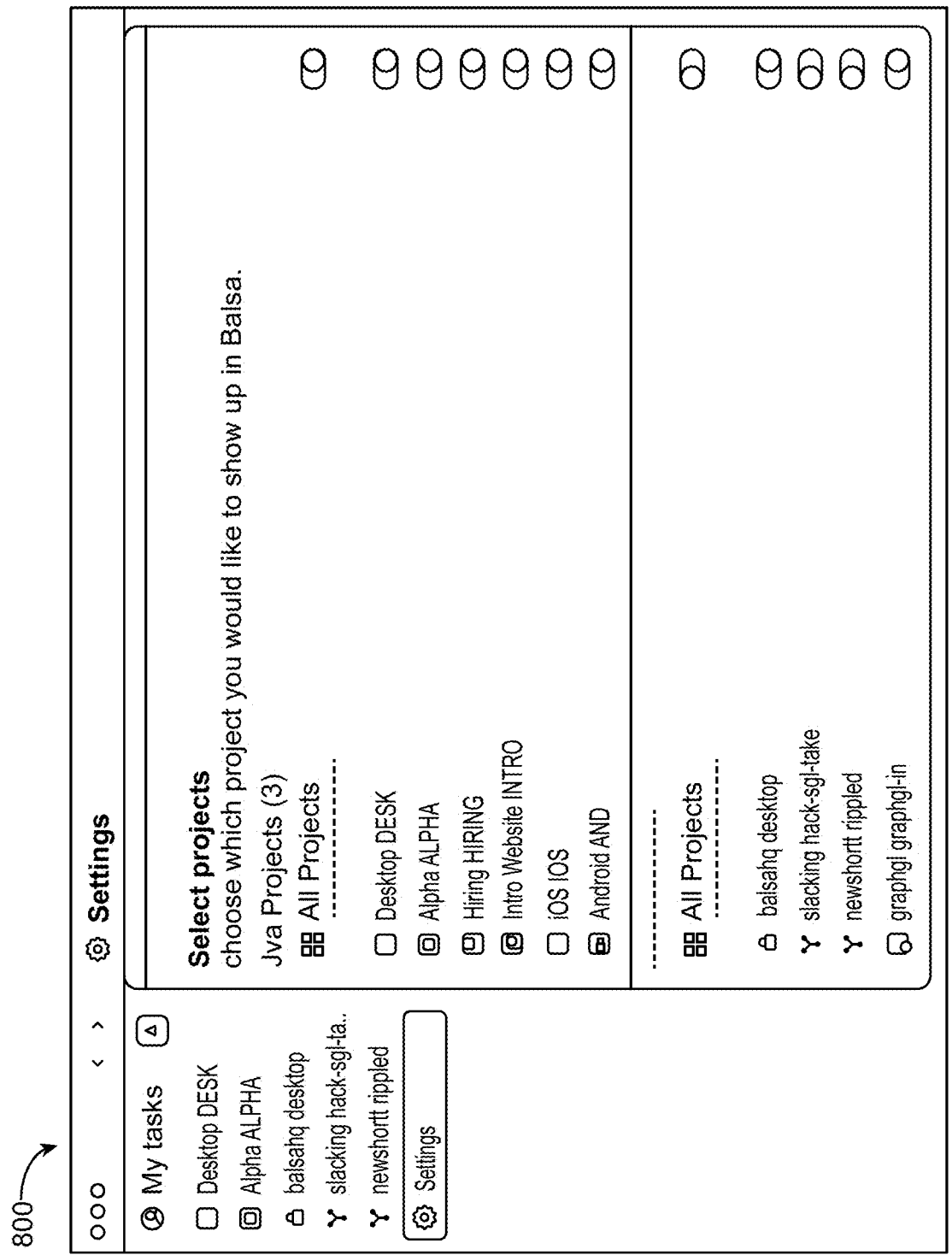

The layout of the project picker may be a slightly modified version onboarding project picker layout, with small (e.g., 18×18) project icons, single line project names and project keys (e.g., similar to those shown in the sidebar), and a small (e.g., 12 pixel) gap between "All" and individual projects. The project picker also may include a section header with number of selected projects (e.g., Jira Projects (3)), and the same technique may be used for Github repositories and/or other types of tickets/tasks. For repositories, different types may be used instead of org icons (e.g., fork, public, private), as shown in the example user interface screen 800 shown in FIG. 8.

The primary pane in the user interface 700 of FIG. 7 is the "My Task" listing for the user. Within this listing, all of the project tickets, pull requests, and/or other tasks that have been assigned to the user are displayed. Note that these project tickets, pull requests, and other tasks are shown in the same uniform list, using a common interface, format, and user experience, regardless of the interface of the underlying tool or backend storage technology.

Various features and functionalities may be implemented within a My Task listing user interface of the project management interface tool. For instance, tasks may be uniformly color-coded based on status (e.g., grayed-out for completed tasks), and tickets/pull requests may be sorted based on the last time they were updated. For the "My Task" view, the user interface may provide the functionality for the user to select and change status of any ticket and/or pull request (e.g., "To Do", "In Progress", "Done"). In some cases, a "PowerHover" feature may be implemented, in which the user may hover over a particular task item, and/or hold down the command key, which may cause the user interface to modify and expose additional user interface controls with more functionality options associated with the ticket/pull request. For instance, after a powerhover operation, additional options may be displayed within the task item on the user interface to allow the user to copy a link to the item (e.g., ticket, pull request, document, calendar appointment, etc.), or to open the item directly using the underlying tool.

Figure 9:
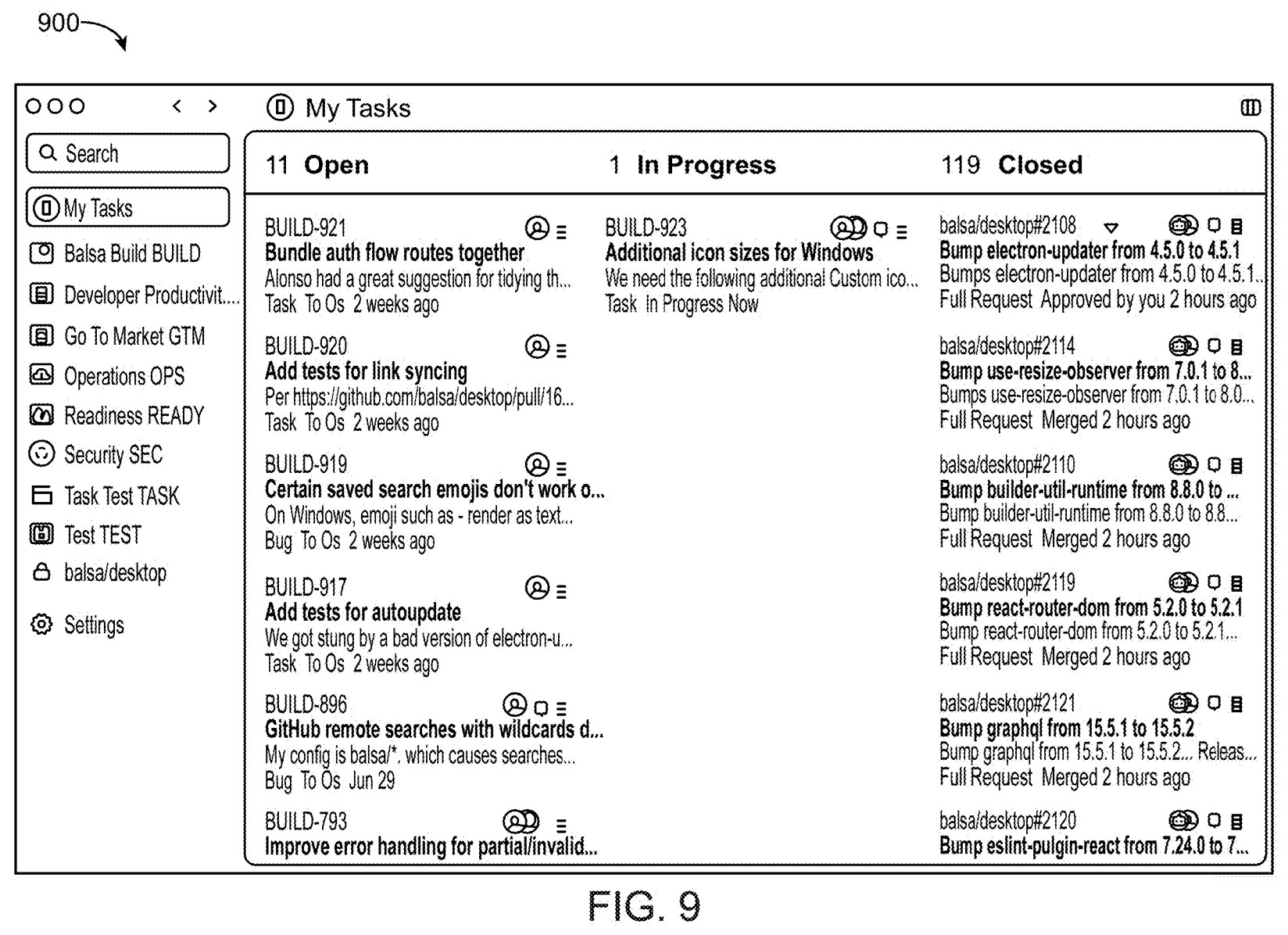

FIG. 9, shown below, depicts an alternative board view of the same "My Task" item listing and sidebar shown in FIG. 7. In some examples, the user interface of the project management interface tool may support toggling between the list view shown in FIG. 7 and the board view shown in FIG. 9, either of which may show listings of task items such as tickets and pull requests, combined and integrated from multiple different underlying tools. In some examples, the board view shown in FIG. 9 may be divided into different sub-board based on the status of the item (e.g., "Open" "In Progress" "Closed"). Additionally, the board view shown in FIG. 9 may support dragging and dropping tickets into different sub-boards to automatically perform status updates, and/or dragging and dropping tickets into different projects within the sidebar to change the projects associated with those tickets.

Figure 10:
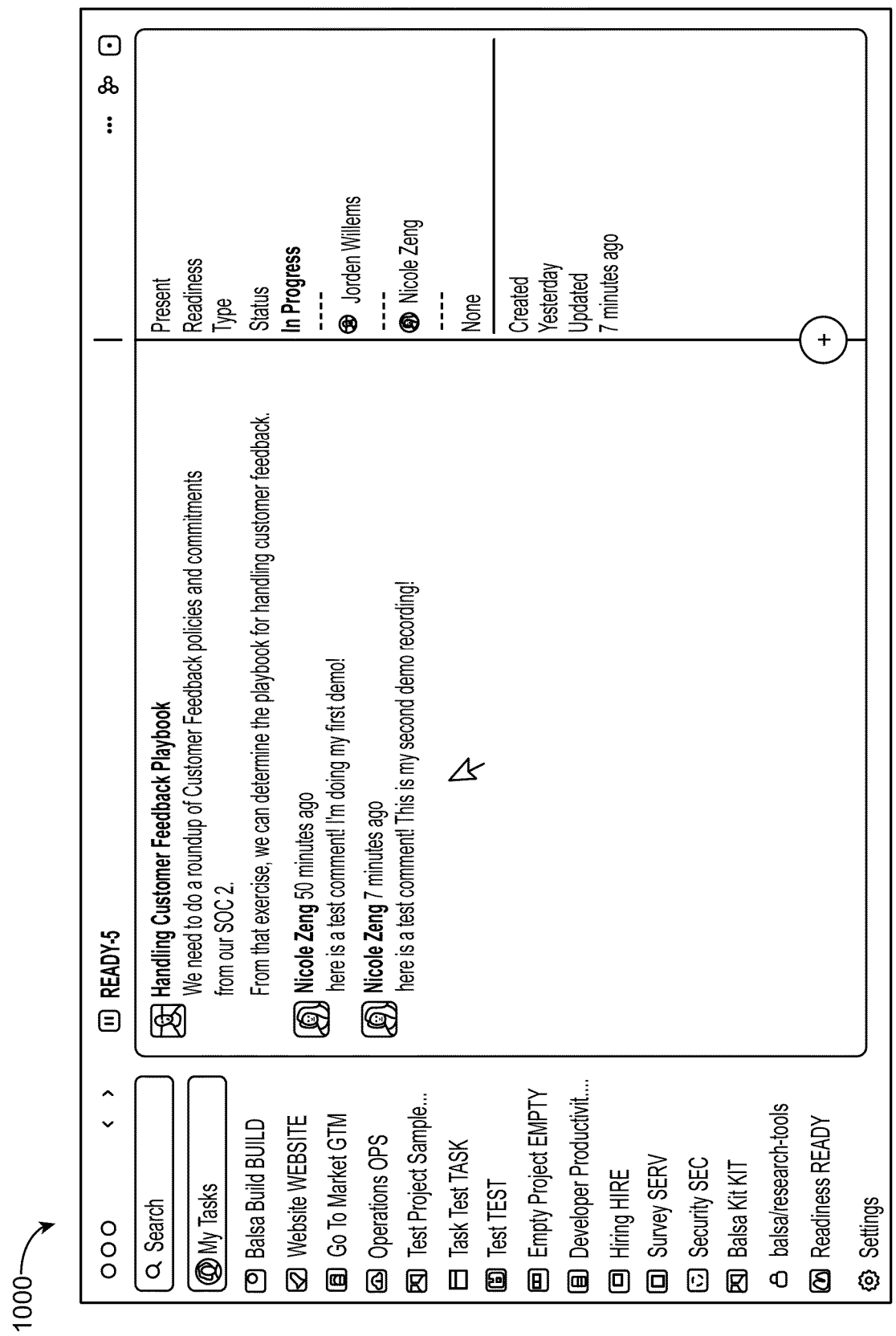
Figure 11:
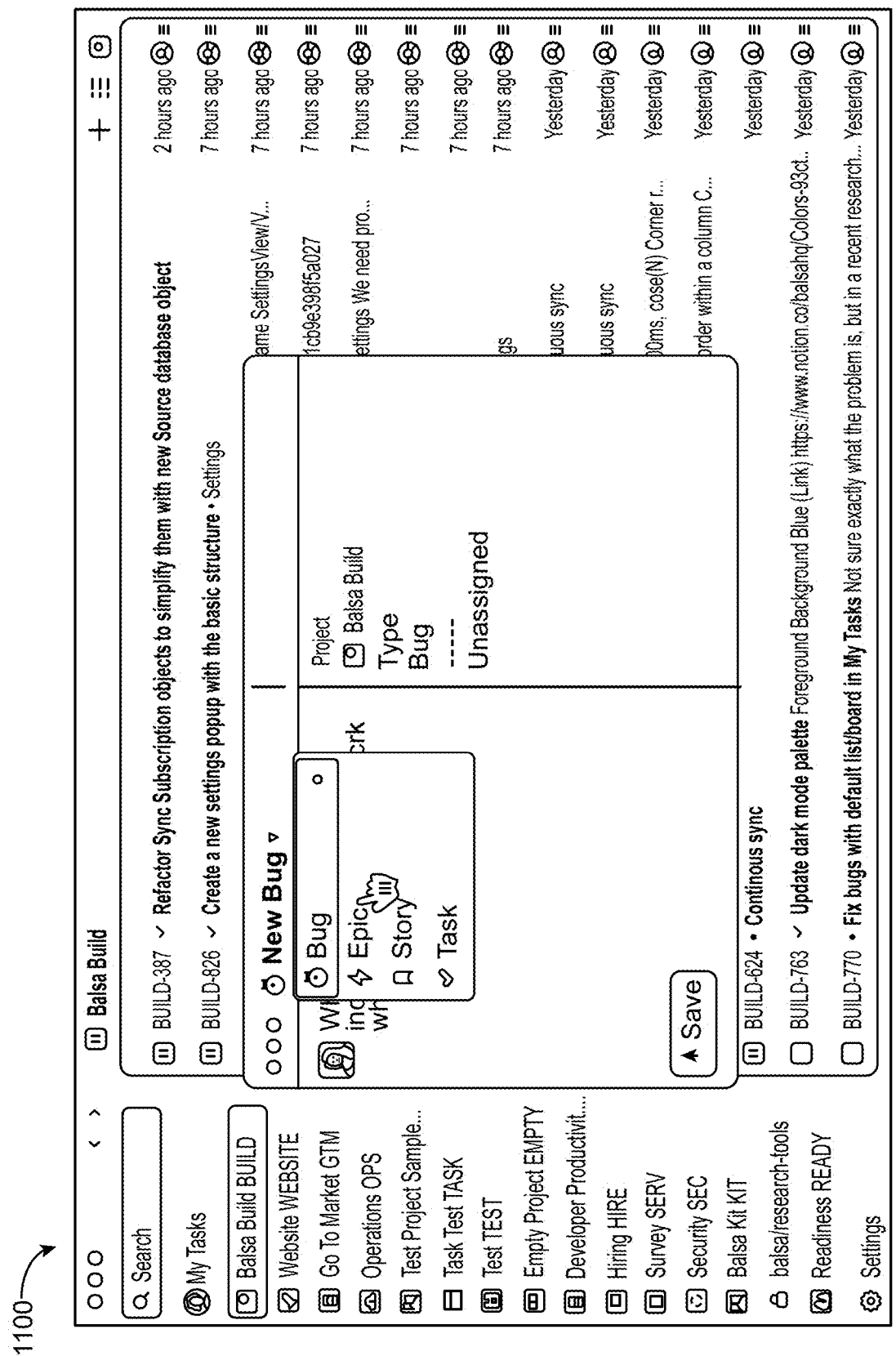

As shown in FIG. 10, from either a list view or a board view, the user may click on a particular item (or ticket) to view and/or additional information relating to that ticket. For instance, a separate interface window may be initiated to allow the user to view and update the ticket title, content/description of the ticket, the status of the ticket, the assignee, to assign a sprint to the ticket, and/or to add comments. Upon clicking "Save", the ticket changes may be submitted and saved locally within the server cache of the project management interface tool, and/or may be updated automatically to the corresponding underlying tool (e.g., Jira, GitHub, Figma, Google Docs, etc.).

In either a list view or a board view, the project management interface tool may support task item creation (e.g., ticket creation), which may be initiated in this example by the user clicking on the "+" icon. The request to create a new task item may invoke a new user interface screen, such as the example user interface 1100 shown in FIG. 11. In this example, the user may select the type of item/ticket (e.g., Bug, Epic, Story, Task), fill in the additional fields to provide the additional ticket details (e.g., name, description, assignee, etc.), and may submit the request (e.g., click "Save") to cause the project management interface tool to determine the appropriate underlying tool (e.g., based on the current project and ticket type), and transmit an instruction to the underlying tool to create an item corresponding to the new ticket request.

In various examples, the project management interface tool also may provide support for filtering the tickets shown within the "My Task" list or board view. For instance, the user may select a particular project from the sidebar, select the filter option within the user interface, and input the filter criteria (e.g., tickets created by the user, tickets assigned to the user, tickets assigned to a different particular user, and/or tickets that have been completed, tickets that are not yet assigned, etc.). Additionally or alternatively, the project management interface tool may provide search support, in which the user may input specific search terms to initiate a search across all of the user's tickets from the various underlying tools. For instance, a set of search results may include a combination of project tickets, pull requests, documents, messages, product specifications, calendar appointments, etc., that satisfy the search criteria.

Powerhover Description and Actions

As noted above, the powerhover feature of the user interface may allow the user hover over a particular ticket item (or other portion of the user interface), to reveal additional user interface controls providing more functionality capable with the particular user interface control and/or region of the user interface.

Figure 13:
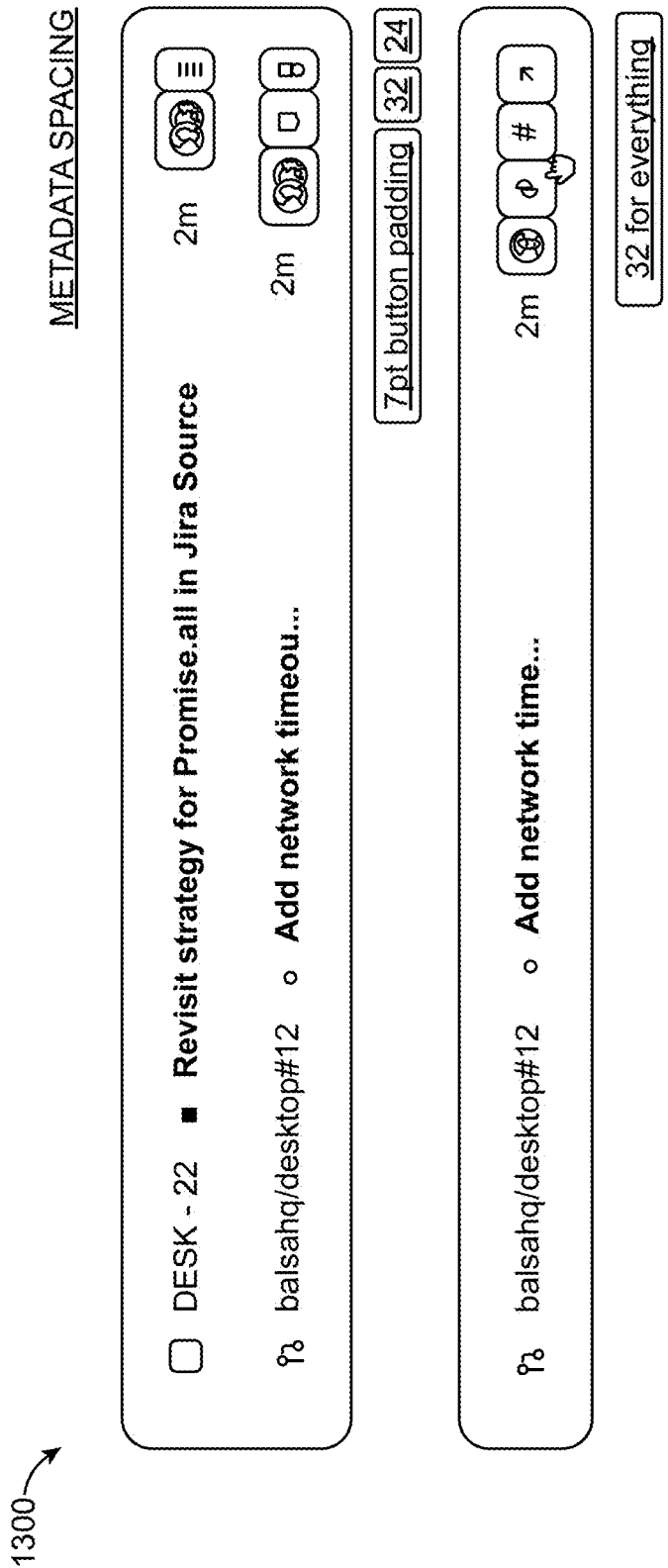

PowerHover Actions
    Allow additional controls with PowerHover, as shown in the example user interface 1200 in FIG. 12.
        Copy issue key ID
            Jira: BUILD-000
            PR: balsa/desktop #1599
        Change assignee (Jira only)
    Hide metadata items that are not editable e.g. comment indicator & line/priority meter
    Update metadata spacing to support PowerHover transformation
On Hover
    Fade out uneditable objects e.g. comments & indicator & line/priority meter, as shown in the example user interface 1300 in FIG. 13.
    Collapse face pile to a single avatar
    Push in PowerHover actions from the left Motion Design
  Fade out uneditable elements on hover
  Opacity timing is quicker than travel time: 100 ms and 300 ms
  Item should fade out quicker than travel to avoid overlapping with existing items
  In the motion study, the uneditable objects move underneath the avatar but it fades
  out before it can overlap
  We can also try scaling down the width of the objects-to-hide and fading out before clipping as well.

PowerHover in detail view, as shown in the example user interface 1400 in FIG. 14. PowerHover in detail view to quickly access easy commands without having to open the overflow menu.

Motion Study
  On holding ⌘ or Ctrl
  Show power over "toast" on the bottom right hand corner
  If the inspector is closed, push and fade the comment button Graphical Data Visualization In some examples, the project management interface tool may support graphical data visualization functionality, which may include:
  Data visualization of connections between issues and people across all connected services
  Data visualization of the specific tasks in progress from week to week
  Data visualization of project status, key people, and remaining work As noted above, in some cases a crawler 106 and/or other techniques may be used to retrieve data and objects from the underlying tools, including task data as well as additional data related to the task data. For instance, for a particular object (e.g., message, update, task request, etc.) retrieved from an underlying tool, the crawler 106 also may retrieve some or all of the data fields and/or metadata associated with the object. Such additional data fields and/or metadata may include the data identifying the people associated or related to the object, such as the individual(s) that created the object, the individual(s) to which the object was assigned, the individual(s) that viewed/modified/closed the object, the individual(s) mentioned in a comment or action associated with the object, etc. The additional data fields and/or metadata for an object also may include other similar/associated objects (e.g., related or linked objects as described above), other similar/associated projects or files, etc.

Figure 15:
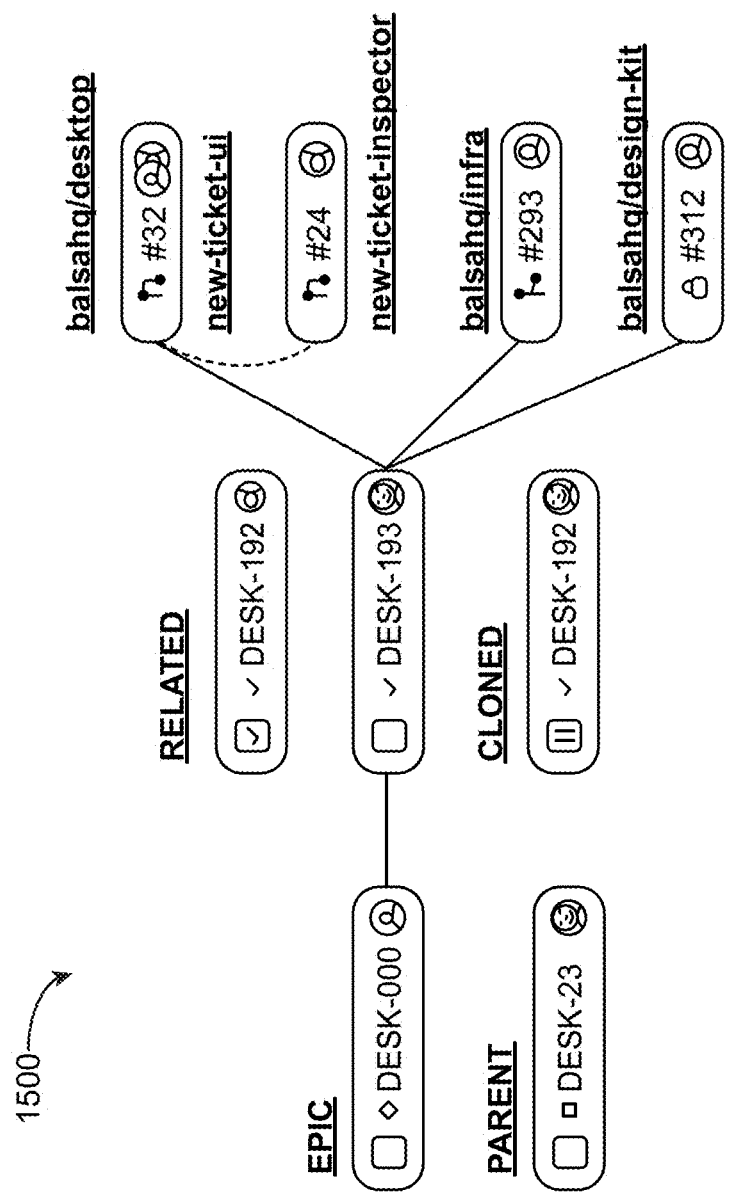
FIGS. 15 and 16 depict example user interface screens of a graphical data visualization tool, in accordance with implementations of the disclosure.

Such data may be analyzed and used by the application to determine relationships (and/or generate corresponding graphs) of associations between individuals, based on the actual interactions of the individuals with different work objects, projects, etc. By way of example, a set of relationships and/or a graph may be generated, as shown in, as shown in the example user interface 1500 in FIG. 15, to reflect the "organization" of individuals that contributes to a particular task, type of task, project, sub-project, etc. Such organizations of individuals may include a team or hierarchy of people based on dynamic functional/work commonalities, and may be entirely different from the team or hierarchy within the human resources, business or organization level. Such functional (e.g., task or project-specific) organizations may include different individuals from different teams, in different roles, and/or employed by different organizations, that the application has determined have common interactions with the same set of tasks/projects over a relevant time period.

Figure 16:
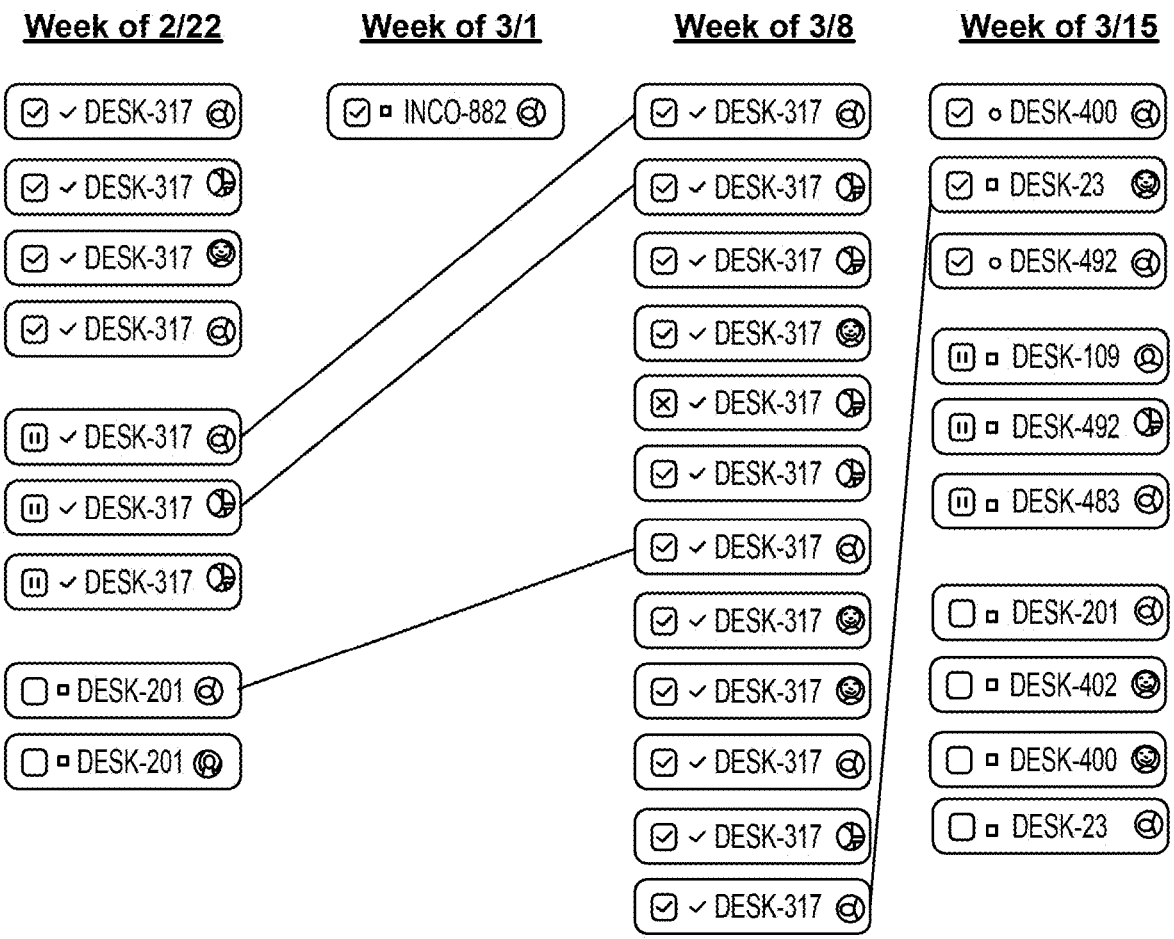

Team timeline: ability to see what everyone's working from week to week across Projects, as shown in the example user interface 1600 in FIG. 16.

Concepts:
  Cluster and connect issues week-to-week by relationship to figure out when a project ramps up/down
  See when the team gets distracted by other commitments e.g. only PRs and no issues (probably an incident week)

Track Sync State
  Source synchronization state events may be ephemeral, so in some systems the client may be unable to "get the current state" at any moment in time. This presents a challenge during initialization, when the UI is drawn before the necessary events are sent over the subscription, e.g. during the auth flow.

To address this issue, the application may cache state at the subscription level and flush the subscription on connect, so that every new subscription gets the last emitted data immediately on connect. In some examples, Subscription-Only GraphQL Data may be used, and each connected subscription may be tracked via id, and an emission may be targeted just to that client.

Another issue is that the last emitted event may not be enough to really get the initial state. For example, consider the following list of SyncStatusSourceResult events:
  Jira→Error
  Github→Succeeded If the client received both of these events, we would prioritize the Jira→Error event. However, if we only flush the last event on subscription connect, we would only receive Github→Succeeded event. In some examples, this issue may be addressed by prioritizing errors, etc.

Another idea to address this issue is to track state on the server and allow it to be queried. Instead of accumulating the sync engine state on the client, accumulate inside each Source on the server, and add graphQL types that allow it to be (a) queried, and (b) subscribed to. This may allow the client to send an initial query for the current state, and then subscribe to any additional state updates.

Example Computing System

Figure 17:
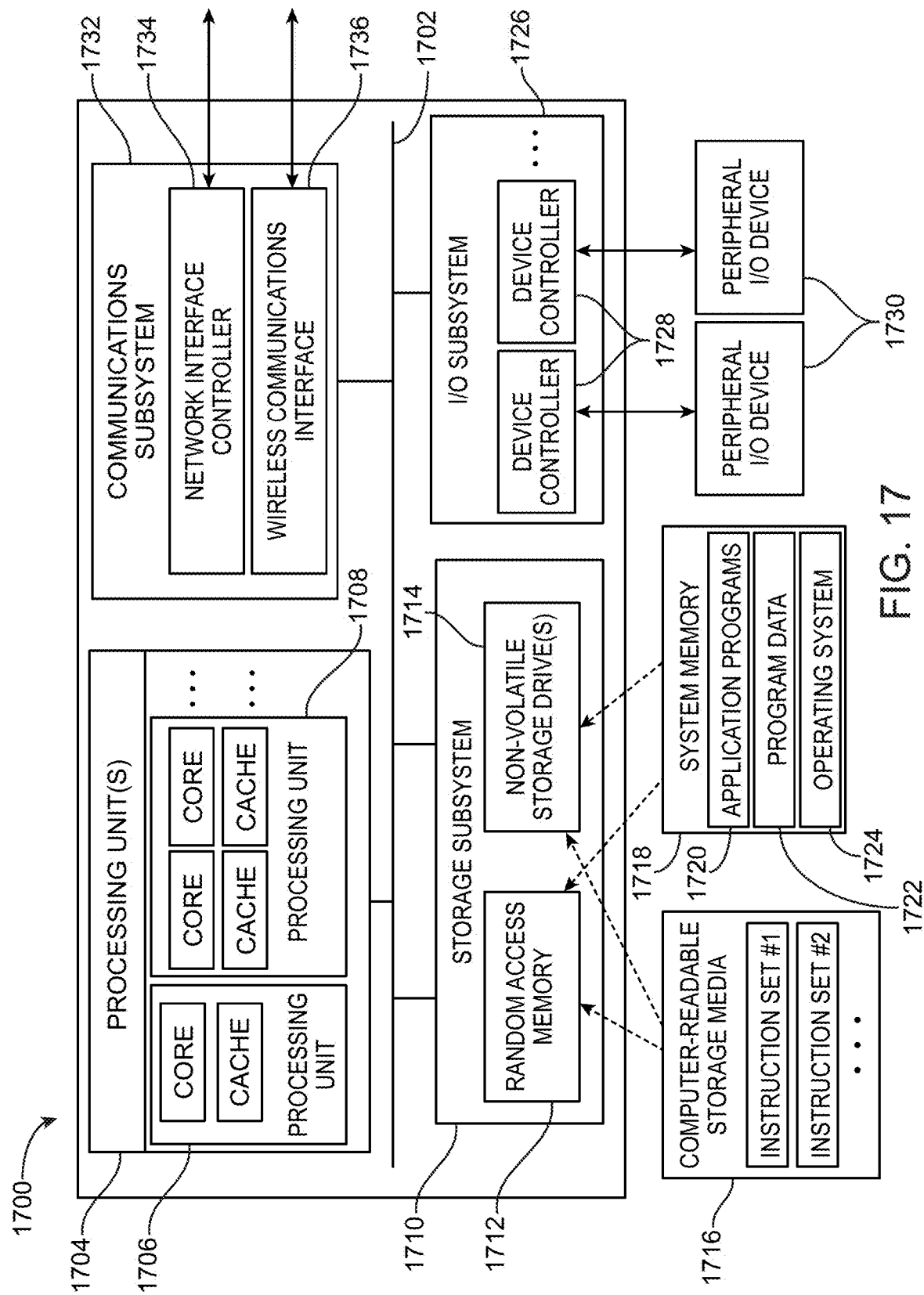
FIG. 17 is a block diagram depicting an example computing environment for implementing various techniques described herein.

With reference now to FIG. 17, a block diagram of an illustrative computer system is shown. The system 1700 may correspond to any of the computing devices or servers described herein for implementing the project management interface tool, including but not limited the client (or end user) device upon with the project management interface tool displays user interfaces, the server of the project management interface tool, which may be implemented on the same or a separate computing system or environment, and/or the computing systems implementing any of the underlying tools.

In this example, computer system 1700 includes processing units 1704 that communicate with a number of peripheral subsystems via a bus subsystem 1702. These peripheral subsystems include, for example, a storage subsystem 1710 (or memory 1710), an I/O subsystem 1726, and a communications subsystem 1732.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which may be implemented as one or more integrated circuits (e.g., a conventional microprocessor or microcontroller), controls the operation of computer system 1700. One or more processors, including single core and/or multicore processors, may be included in processing unit 1704. As shown in this example, processing unit 1704 may be implemented as one or more independent processing units 1706 and/or 1708 with single or multicore processors and processor caches included in each processing unit. In other embodiments, processing unit 1704 may also be implemented as a quad-core processing unit or larger multicore designs (e.g., hexa-core processors, octo-core processors, ten-core processors, or greater.

Processing unit 1704 may execute a variety of software processes embodied in program code, and may maintain multiple concurrently executing programs or processes. At any given time, some or all of the program code to be executed can be resident in processor(s) 1704 and/or in storage subsystem 1710. In some embodiments, computer system 1700 may include one or more specialized processors, such as digital signal processors (DSPs), outboard processors, graphics processors, application-specific processors, and/or the like.

I/O subsystem 1726 may include device controllers 1728 for one or more user interface input devices and/or user interface output devices 1730. User interface input and output devices 1730 may be integral with the computer system 1700 (e.g., integrated audio/video systems, and/or touchscreen displays), or may be separate peripheral devices which are attachable/detachable from the computer system 1700.

Input devices 1730 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 1730 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 1730 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 1730 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 1700 to a user or other computer. For example, output devices 1730 may include, without limitation, a variety of display devices that visually convey text, graphics and audio/video information such as monitors, printers, speakers, headphones, automotive navigation systems, plotters, voice output devices, and modems.

Computer system 1700 may comprise one or more storage subsystems 1710, comprising hardware and software components used for storing data and program instructions, such as system memory 1718 and computer-readable storage media 1716. The system memory 1718 and/or computer-readable storage media 1716 may store program instructions that are loadable and executable on processing units 1704, as well as data generated during the execution of these programs.

Depending on the configuration and type of computer system 1700, system memory 1718 may be stored in volatile memory (such as random-access memory (RAM) 1712) and/or in non-volatile storage drives 1714 (such as read-only memory (ROM), flash memory, etc.) The RAM 1712 may contain data and/or program modules that are immediately accessible to and/or presently being operated and executed by processing units 1704. In some implementations, system memory 1718 may include multiple different types of memory, such as static random-access memory (SRAM) or dynamic random-access memory (DRAM). In some implementations, a basic input/output system (BIOS), containing the basic routines that help to transfer information between elements within computer system 1700, such as during start-up, may typically be stored in the non-volatile storage drives 1714. By way of example, and not limitation, system memory 1718 may include application programs 1720, such as client applications, Web browsers, mid-tier applications, server applications, etc., program data 1722, and an operating system 1724.

Storage subsystem 1710 also may provide one or more tangible computer-readable storage media 1716 for storing the basic programming and data constructs that provide the functionality of some embodiments. Software (programs, code modules, instructions) that when executed by a processor provide the functionality described herein may be stored in storage subsystem 1710. These software modules or instructions may be executed by processing units 1704. Storage subsystem 1710 may also provide a repository for storing data used in accordance with certain examples.

Storage subsystem 1710 may also include a computer-readable storage media reader that can further be connected to computer-readable storage media 1716. Together and, optionally, in combination with system memory 1718, computer-readable storage media 1716 may comprehensively represent remote, local, fixed, and/or removable storage devices plus storage media for temporarily and/or more permanently containing, storing, transmitting, and retrieving computer-readable information.

Computer-readable storage media 1716 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1700.

By way of example, computer-readable storage media 1716 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1716 may include, but is not limited to, Zip® drives, flash memory cards, universal serial bus (USB) flash drives, secure digital (SD) cards, DVD disks, digital video tape, and the like. Computer-readable storage media 1716 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1732 may provide a communication interface from computer system 1700 and external computing devices via one or more communication networks, including local area networks (LANs), wide area networks (WANs) (e.g., the Internet), and various wireless telecommunications networks. As illustrated in FIG. 17, the communications subsystem 1732 may include, for example, one or more network interface controllers (NICs) 1734, such as Ethernet cards, Asynchronous Transfer Mode NICs, Token Ring NICs, and the like, as well as one or more wireless communications interfaces 1736, such as wireless network interface controllers (WNICs), wireless network adapters, and the like. Additionally and/or alternatively, the communications subsystem 1732 may include one or more modems (telephone, satellite, cable, ISDN), synchronous or asynchronous digital subscriber line (DSL) units, FireWire® interfaces, USB® interfaces, and the like. Communications subsystem 1736 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 1732 may be detachable components coupled to the computer system 1700 via a computer network, a FireWire® bus, or the like, and/or may be physically integrated onto a motherboard of the computer system 1700. Communications subsystem 1732 also may be implemented in whole or in part by software.

In some embodiments, communications subsystem 1732 may also receive input communication in the form of structured and/or unstructured data feeds, event streams, event updates, and the like, on behalf of one or more users who may use or access computer system 1700. For example, communications subsystem 1732 may be configured to receive data feeds in real-time from users of social networks and/or other communication services, web feeds such as Rich Site Summary (RSS) feeds, and/or real-time updates from one or more third party information sources. Additionally, communications subsystem 1732 may be configured to receive data in the form of continuous data streams, which may include event streams of real-time events and/or event updates (e.g., data streams from underlying tools, network performance tools, etc.). Communications subsystem 1732 may output such structured and/or unstructured data feeds, event streams, event updates, and the like to one or more data stores that may be in communication with one or more streaming data source computers coupled to computer system 1700.

Due to the ever-changing nature of computers and networks, the description of computer system 1700 depicted in FIG. 17 is intended only as a specific example. Many other configurations having more or fewer components than computer system 1700 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the claims.

What is claimed is:

1. A method comprising:
    receiving a first data object of a first object type, from a first software tool, based on a least in part on a user identifier or project identifier;
    receiving a second data object of a second object type from a second software tool, based on a least in part on a user identifier or project identifier, wherein the second software tool is different from the first software tool and the second object type is different from the first object type;
    generating a first task component object based at least in part on the first data object;
    generating a second task component object based at least in part on the second data object; and
    generating and presenting a user interface view comprising a uniform object listing, the uniform object listing including the first task component object and the second task component object.

2. The method of claim 1, wherein generating and presenting a user interface view comprises:
    determining a first time associated with the first data object, based on the first software tool;
    determining a second time associated with the second data object, based on the second software tool; and
    ordering the first task component object and the second task component object within the uniform object listing, based at least in part on the first time and the second time.

3. The method of claim 1, further comprising:
    receiving a selection of the first task component object, via the user interface view;
    receiving updated data associated with the first task component object; and
    transmitting the updated data to the first software tool.

4. The method of claim 3, wherein transmitting the updated data to the first software tool comprises:
    generating and storing a pending update data object corresponding to the updated data;
    determining an updated uniform object listing, based at least in part on the first data object received from the first software tool, and the pending update data object;
    updating the uniform object listing within the user interface view, based on at least in part on the updated uniform object listing;
    determining a transmission time associated with transmitting the updated data to the first software tool; and
    transmitting the updated data to the first software tool at the transmission time, wherein the transmitting is performed after updating the uniform object listing.

5. The method of claim 1, further comprising:
    receiving a first field from the first data object;
    receiving a second field from the second data object;
    determining an association between the first data object and the second data object, based at least in part on the first field and the second field; and
    updating the uniform object listing within the user interface view, based at least in part on determining the association between the first data object and the second data object.

6. The method of claim 1, further comprising:
    receiving, via the user interface view, a selection and/or a hover action associated with the first task component object;
    determining a user option associated with the first task component object, based at least in part on the first software tool; and
    updating the user interface view to present the user option associated with the first task component object.

7. The method of claim 1, further comprising:
    predicting a user selection of a second task component object within the uniform object listing;
    initiating a synchronization of a second data object, from the second software tool, based at least in part on predicting the user selection of the second task component object; and
    updating the user interface view after the synchronization of the second data object.

8. A system comprising:
    one or more processors; and
    one or more non-transitory computer-readable media storing instructions that, when executed by the one or more processors, cause the system to perform operations comprising:

receiving a first data object of a first object type, from a first software tool, based on a least in part on a user identifier or project identifier;

receiving a second data object of a second object type from a second software tool, based on a least in part on a user identifier or project identifier, wherein the second software tool is different from the first software tool and the second object type is different from the first object type;

generating a first task component object based at least in part on the first data object;

generating a second task component object based at least in part on the second data object; and generating and presenting a user interface view comprising a uniform object listing, the uniform object listing including the first task component object and the second task component object.

9. The system of claim 8, wherein generating and presenting a user interface view comprises:

determining a first time associated with the first data object, based on the first software tool;

determining a second time associated with the second data object, based on the second software tool; and ordering the first task component object and the second task component object within the uniform object listing, based at least in part on the first time and the second time.

10. The system of claim 8, the operations further comprising:

receiving a selection of the first task component object, via the user interface view;

receiving updated data associated with the first task component object; and transmitting the updated data to the first software tool.

11. The system of claim 10, wherein transmitting the updated data to the first software tool comprises:

generating and storing a pending update data object corresponding to the updated data;

determining an updated uniform object listing, based at least in part on the first data object received from the first software tool, and the pending update data object;

updating the uniform object listing within the user interface view, based on at least in part on the updated uniform object listing;

determining a transmission time associated with transmitting the updated data to the first software tool; and transmitting the updated data to the first software tool at the transmission time, wherein the transmitting is performed after updating the uniform object listing.

12. The system of claim 8, the operations further comprising:

receiving a first field from the first data object;

receiving a second field from the second data object;

determining an association between the first data object and the second data object, based at least in part on the first field and the second field; and updating the uniform object listing within the user interface view, based at least in part on determining the association between the first data object and the second data object.

13. The system of claim 8, the operations further comprising:

receiving, via the user interface view, a selection and/or a hover action associated with the first task component object;

determining a user option associated with the first task component object, based at least in part on the first software tool; and updating the user interface view to present the user option associated with the first task component object.

14. The system of claim 8, the operations further comprising:

predicting a user selection of a second task component object within the uniform object listing;

initiating a synchronization of a second data object, from the second software tool, based at least in part on predicting the user selection of the second task component object; and updating the user interface view after the synchronization of the second data object.

15. One or more non-transitory computer-readable media storing instructions that, when executed, cause one or more processors to perform operations comprising:

receiving a first data object of a first object type, from a first software tool, based on a least in part on a user identifier or project identifier;

receiving a second data object of a second object type from a second software tool, based on a least in part on a user identifier or project identifier, wherein the second software tool is different from the first software tool and the second object type is different from the first object type;

generating a first task component object based at least in part on the first data object;

generating a second task component object based at least in part on the second data object; and generating and presenting a user interface view comprising a uniform object listing, the uniform object listing including the first task component object and the second task component object.

16. The non-transitory computer-readable media of claim 15, wherein generating and presenting a user interface view comprises:

determining a first time associated with the first data object, based on the first software tool;

determining a second time associated with the second data object, based on the second software tool; and ordering the first task component object and the second task component object within the uniform object listing, based at least in part on the first time and the second time.

17. The non-transitory computer-readable media of claim 15, the operations further comprising:

receiving a selection of the first task component object, via the user interface view;

receiving updated data associated with the first task component object; and transmitting the updated data to the first software tool.

18. The non-transitory computer-readable media of claim 17, wherein transmitting the updated data to the first software tool comprises:

generating and storing a pending update data object corresponding to the updated data;

determining an updated uniform object listing, based at least in part on the first data object received from the first software tool, and the pending update data object;

updating the uniform object listing within the user interface view, based on at least in part on the updated uniform object listing;

determining a transmission time associated with transmitting the updated data to the first software tool; and transmitting the updated data to the first software tool at the transmission time, wherein the transmitting is performed after updating the uniform object listing.

19. The non-transitory computer-readable media of claim 15, the operations further comprising:
receiving a first field from the first data object;
receiving a second field from the second data object;
determining an association between the first data object and the second data object, based at least in part on the first field and the second field; and
updating the uniform object listing within the user interface view, based at least in part on determining the association between the first data object and the second data object.

20. The non-transitory computer-readable media of claim 15, the operations further comprising:
receiving, via the user interface view, a selection and/or a hover action associated with the first task component object;
determining a user option associated with the first task component object, based at least in part on the first software tool; and
updating the user interface view to present the user option associated with the first task component object.

* * * * *